(12) United States Patent
Jahromi et al.

(10) Patent No.: US 8,865,295 B2
(45) Date of Patent: Oct. 21, 2014

(54) PROCESS FOR THE PREPARATION OF A MULTILAYER STRUCTURE COMPRISING A SUBSTRATE, A CRYSTALLINE ORGANIC BARRIER LAYER, AND A PRINTED PATTERN; AND PRODUCTS OBTAINED

(71) Applicant: DSM IP Assets B.V., Heerlen (NL)

(72) Inventors: Shahab Jahromi, Maastricht (NL); Constantinus Simon Maria Liebregts, Helmond (NL); Karel Franciscus Hubertus Bonekamp, Elsloo (NL)

(73) Assignee: DSM Assets B.V., Heerlen (NL)

( * ) Notice: Subject to any disclaimer, the term of this patent is extended or adjusted under 35 U.S.C. 154(b) by 0 days.

(21) Appl. No.: 13/742,486

(22) Filed: Jan. 16, 2013

(65) Prior Publication Data

US 2013/0129992 A1 May 23, 2013

Related U.S. Application Data

(63) Continuation of application No. PCT/EP2011/062386, filed on Jul. 19, 2011.

(30) Foreign Application Priority Data

Jul. 22, 2010 (EP) .................................... 10170466

(51) Int. Cl.
| | | |
|---|---|---|
| *B32B 3/10* | (2006.01) | |
| *B29D 7/01* | (2006.01) | |
| *B41M 3/00* | (2006.01) | |
| *B41M 7/00* | (2006.01) | |
| *B41M 7/02* | (2006.01) | |
| *B32B 7/12* | (2006.01) | |
| *B32B 9/04* | (2006.01) | |
| *B32B 15/04* | (2006.01) | |
| *B32B 37/15* | (2006.01) | |
| *B32B 38/00* | (2006.01) | |
| *B32B 27/08* | (2006.01) | |
| *B32B 27/32* | (2006.01) | |
| *B32B 27/36* | (2006.01) | |

(52) U.S. Cl.
CPC ... *B32B 3/10* (2013.01); *B29D 7/01* (2013.01); *B41M 3/00* (2013.01); *B41M 7/0045* (2013.01); *B41M 7/0054* (2013.01); *B41M 7/02* (2013.01); *B32B 7/12* (2013.01); *B32B 9/04* (2013.01); *B32B 15/04* (2013.01); *B32B 37/153* (2013.01); *B32B 38/145* (2013.01); *B32B 2255/10* (2013.01); *B32B 2255/205* (2013.01); *B32B 2255/24* (2013.01); *B32B 2255/26* (2013.01); *B32B 2255/28* (2013.01); *B32B 2307/4023* (2013.01); *B32B 2307/7244* (2013.01); *B32B 2307/75* (2013.01); *B32B 2457/20* (2013.01); *B32B 27/08* (2013.01); *B32B 27/32* (2013.01); *B32B 27/36* (2013.01); *B32B 2307/7246* (2013.01); *B32B 2439/70* (2013.01)

USPC ......................................... 428/195.1; 428/204

(58) Field of Classification Search
CPC .................................... B29D 7/01; B32B 3/10
USPC ......................................................... 428/204
See application file for complete search history.

(56) References Cited

U.S. PATENT DOCUMENTS

| | | | |
|---|---|---|---|
| 6,632,519 B1 | 10/2003 | Jahromi et al. | |
| 8,318,276 B2 * | 11/2012 | Jahromi et al. | ............... 428/35.7 |

FOREIGN PATENT DOCUMENTS

| | | |
|---|---|---|
| WO | 9966097 A1 | 12/1999 |
| WO | 2004/101662 A | 11/2004 |
| WO | 2008/083934 A | 7/2008 |
| WO | 2008/092553 A1 | 8/2008 |
| WO | 2010/012878 A1 | 1/2009 |
| WO | 2010/003958 A1 | 1/2010 |
| WO | 2010003965 A1 | 10/2010 |

* cited by examiner

*Primary Examiner* — Elizabeth Mulvaney
(74) *Attorney, Agent, or Firm* — Hoyng Monegier LLP; David P. Owen; Minerva Rivero

(57) ABSTRACT

The invention provides a process for making a multilayer structure with a printed pattern by providing a film substrate having a crystalline organic compound layer, wherein the substrate optionally has a metal or metaloxide layer between the film substrate and the organic compound layer; applying a printed pattern via a plurality of printing rolls wherein the following steps are performed: optionally, applying as a first layer a primer over the whole surface, applying one or more ink layers on the film to obtain a printed pattern, and optionally, applying a cover varnish to obtain a film substrate with a crystalline organic compound layer and a printed pattern. The invention further relates to a laminate comprising a multilayer structure and a plastic film; the laminate preferably comprises a primer substantially covering the whole surface of the organic compound layer, on which primer the print is present.

14 Claims, No Drawings

PROCESS FOR THE PREPARATION OF A MULTILAYER STRUCTURE COMPRISING A SUBSTRATE, A CRYSTALLINE ORGANIC BARRIER LAYER, AND A PRINTED PATTERN; AND PRODUCTS OBTAINED

CROSS-REFERENCE TO RELATED APPLICATIONS

This application is a continuation of PCT application number PCT/EP2011/062386 filed on 19 Jul. 2011, which claims priority from EP application number 10170466.6 filed on 22 Jul. 2010. Both applications are hereby incorporated by reference in their entireties.

BACKGROUND OF THE INVENTION

The invention relates to a multilayer structure comprising at least one plastic film, a crystalline organic barrier layer and a printed pattern. The invention further relates to a process for the preparation thereof.

The invention furthermore relates to a laminate comprising the multilayer structure and a further plastic film.

Plastic films are used in laminates and labels or lids for packaging, electronic and other industries. Often, such films and laminates have decorative characteristics, like printings and/or functional characteristics, like good barrier properties such as low oxygen or water vapor transmission rates.

For improving the barrier properties of laminates, plastic films often are coated with one or more layers. Yet, the adhesion between the outer films needs to be sufficiently high. Laminates are known with on a first side a plastic film, for example polyolefin, polyamide or polyester films, which is coated with a metal or metal oxide, like e.g. aluminum, aluminum oxide, magnesium oxide or silicium oxide. The film with barrier properties is generally laminated with e.g. a further polyolefin film while using an adhesive, or with extrusion lamination. Such laminates can have good barrier properties. However, the metal layers that are used to enhance the barrier properties are non-transparent, cause environmental concern as they consume high amount of energy for deposition, cause difficulties in recycling, and are not micro-waveable. Metal oxide layers that are used to enhance barrier properties are easily damaged, expensive and require high level operators to reliably produce laminates. PVDC type of barrier films cause environmental concerns because of its chlorine content. EVOH type of barrier films are highly moisture sensitive. Crystalline organic barrier, like triazine layers, such as melamine or other organic compounds are known as well (see e.g. WO99/66097 or WO2010/003958). These layers are transparent and recyclable. It appears however, that during processing—like all barrier layers—the barrier properties may become impeded. Thus, an ongoing search for laminates with barrier layers is apparent, in which the laminates have and/or retain good properties.

For lids, shrink wrap labels and the like, the barrier properties are not the primary goal, but printing needs to be of high quality and withstand harsh conditions during the application of lids for example on bottles and subsequent wash steps. This often is difficult on bare film. Hence, primers and the like are used. Yet, improvement with respect to economy of such printing is still searched for.

SUMMARY OF THE INVENTION

It is an object of the invention to provide a multilayer structure comprising at least one plastic film a crystalline organic layer and a printed pattern.

A further object of the invention is to provide a laminate having good barrier properties and a good lamination strength, and having a printed pattern.

A further object of the invention is to provide a laminate having good barrier properties and a good lamination strength, while using a lamination adhesive.

A further object of the invention is to provide a metal or metal oxide coated film having a printed pattern which is abrasive resistant and withstands high humidity conditions.

One or more of the above objects are achieved with the current invention, providing a process for making a multilayer structure with a printed pattern by
a) providing a film substrate having a crystalline organic compound layer, wherein the substrate optionally has a metal or metaloxide layer between the film substrate and the organic compound layer;
b) applying a printed pattern via a plurality of printing rolls wherein the following steps are performed:
  b1) optionally, applying as a first layer a primer over the whole surface,
  b2) applying one or more ink layers on the film to obtain a printed pattern, and
  b3) optionally, applying a cover varnish layer;
to obtain a film substrate with a crystalline organic compound layer and a printed pattern.

The invention further relates to a multilayer structure comprising a film substrate having a crystalline organic compound layer and optionally a metal or metaloxide layer between the film substrate and the crystalline organic compound layer, said multilayer structure having (a) optionally a primer substantially covering the whole surface of the organic compound layer (b) a printed pattern on the crystalline organic compound layer or primer, and (c) optionally a cover varnish layer.

Such multilayer structure, when the proper inks and optionally the one and/or the other layer is used, is very suitable as plastic wrap, lid, or it can be easily further processed to laminates. Such laminates are used for example in gas flushed packaging applications, so-called Modified Atmosphere Packaging (MAP). Here the air inside the package is replaced by other gases such as N2, CO2, O2 or a combination thereof (being different from air). The barrier properties of the laminate should be such to retain these modified gases inside the package for a prolonged period of time and thus help keeping the food inside the package fresh resulting in extended shelf of packaged goods.

One or more of the above objects are furthermore achieved with the current invention, providing a process for making laminates with barrier properties and a printed pattern by
a) providing a film substrate having a crystalline organic compound layer wherein the substrate optionally has a metal or metaloxide layer between the film substrate and the organic compound layer;
b) applying a printed pattern via a plurality of printing rolls wherein,
  b1) applying as a first layer a primer over the whole surface to obtain a film substrate with a crystalline organic compound layer and a printed pattern, and
c) applying a further film,
to obtain a laminate.

The invention further relates to a laminate comprising a film substrate and a further plastic film and in between a crystalline organic compound layer, the laminate having a printed pattern on the crystalline organic compound layer and comprising a primer substantially covering the whole surface of the organic compound layer, on which primer the printed pattern is present.

Such laminate has outstanding barrier and durability properties. Furthermore, the laminates of the present invention can be used in packaging for microwaveable food applications, and can be easily recycled.

Furthermore, it appears that the crystalline organic compound layer covered with a primer directly before printing causes no decrease or virtually no decrease of barrier characteristics due to printing. Generally, printing causes a decrease in barrier properties. The present laminate has good final properties.

In a further embodiment according the invention, the lamination process is performed such that the multilayer substrate is transported over a larger guiding roll, and that a further plastic film is provided with the adhesive.

DETAILED DESCRIPTION OF THE INVENTION

Films that are used in the packaging industry, in particular in the food packaging industry, generally have both protective and decorative purposes. For these purposes, a variety of technologies is available. The decorative aspect is provided by printing. The two common printing methods in flexible packaging using plastic films are flexo and gravure.

Flexo printing is provided by having a large guiding central drum around which smaller printing drums are located; the small drums being from rubbery material. The film is subjected to relatively small mechanical curve-forces, as the large inner drum determines the curve to which the film is subjected. On the other hand, the press-forces are higher than in gravure, as the small rolls with the printing patterns exert pressure at the places where the pattern is to be printed. Yet, the roll is of rubbery material, which softens the pressure somewhat. The exerted pressure is relatively small as too much pressure may result in bad printing quality. The inks in flexo are generally based on a mixture of alcohol and ethylacetate. Solvents based on ethylacetate only would deteriorate the rubber roll. Generally, several printing stations are used (with e.g. different colors and different patterns), and the inks are to a certain extent, but not fully, dried in between the different printing stations. This printing technology approaches wet-on-wet printing.

Gravure printing (also named roto-gravure) is provided by having multiple stations with smaller drums; the drums being from metal. The film is subjected to higher mechanical curve forces, as each time the smaller drums cause the film to curve over a smaller radium than the large drum in flexo. Yet, the press forces are smaller than in flexo, because the ink is present in small recesses in the metal roll. The inks in gravure are generally fully based on ethylacetate, as this allows high speed drying. Generally, each applied layer is dried in an oven, leading to substantial dry-on-dry printing.

Inks generally comprise a binder, a pigment, additives and solvents. The binder generally is a polymer like polyurethane, polyamide (PA), (PVB) Poly Vinyl Butyral, (CAB) cellulose acetate butyrate, (PVC) polyvinylchloride, polyvinylalcohol (PVA) and polyacrylates (acrylic). The pigments are widely available and generally are concentrated pigments dispersed in dispersants. The pigments may be based on inorganic materials such as TiO2 for white ink or organic materials. Additives are for example waxes, flow agents and dispersants like nitrocellulose. The solvent generally is in practice either ethylacetate or a mixture of ethylacetate and an alcohol.

Sometimes a primer is used on some films; a primer generally consists of a binder, additives and solvent. A primer generally does not contain pigments and as such is transparent (also referred to as transparent ink). Sometimes a varnish is used on the printed pattern, protecting the printed pattern.

The varnish may have the same components as the primer. The application of varnish may be necessary for example in label applications (both pressure sensitive and rap around labels) whereby the printed area may be subjected to very humid conditions during filling process and subsequent uses.

The films most commonly used, are thermoplastic films like biaxially oriented polypropylene (BOPP), oriented polyamide (OPA), polyethyleneterephthalate, oriented polyesters (PET), polyethylene (PE), polylactic acid (PLA). Such films may be provided with a layer having functional properties (barrier properties for oxygen and/or water) like metals or metal oxide. Such layers provide barrier properties. Metal films also provide decorative properties, as metallic decoration.

Printability on bare films, on metalized films (films with a vapour deposited metal layer) or on films with a metal-oxide layer each have their own challenges. These challenges are aggravated in case functional properties need to be preserved, while obtaining good adhesion of the ink patterns to the substrate or with any of the further layers.

It has been found by the inventors that a crystalline organic compound layer, having barrier properties by itself, can have the same functional properties, in combination with a printed pattern by using other functional layers with protective properties. However, these characteristics may be dependent on the thickness of the layer of the organic compound; the type of ink; the type of printing method; the use of a primer and the use of a protective coating. Thus, herein below the teaching of a number of different variants is given, leading the skilled person to understand in which way good multilayer substrates and laminates can be obtained for a variety of uses, while using a crystalline organic compound layer.

Thus, the present invention provides a variety of methods to improve the performance of films with a printable pattern, and also comprises products obtainable with such processes.

Depending on the technology used, it appeared that the printing inks could damage the organic compound layer, like a melamine layer, to an extent that barrier properties were lowered, and/or that adhesion of the ink to the substrate was lowered.

Thus, in a first embodiment, this problem was solved by applying a triazine layer of about 10 to 300 nanometer. Generally, for barrier properties, a thickness of about 50 nanometer appeared to be sufficient. Sometimes a lower thickness is sufficient, but properties were much improved with higher thickness layers of triazine compound. Hence, preferably, a thickness of about 105 to 200 nm is used.

In a second embodiment, this problem was solved while using flexo printing technique and low impact inks, using less than 50 wt % alcohol as the solvent.

In a further embodiment, the problem of lowering of one or more properties caused by printing, was solved by using a primer over substantially the whole surface area of the film with the crystalline organic compound layer. This solution is particularly advantageous, because it solves most problems in one standard way. It is preferred that the primer is a fast drying layer which causes a continuous closed layer. It may be useful to have a solvent system adjusted to optimize the quality of the primer layer and drying thereof. In one preferred embodiment, the solvent system of the primer to be applied on the crystalline organic compound layer contains a mixture of fast and slower drying solvents; preferably, the solvent system comprises between 5-50 wt % of alcohol and between 50-95 wt % of ethylacetate.

In a further embodiment, gravure printing is applied with using ethylacetate based inks.

In a further embodiment, a crystalline organic compound layer of a thickness of between 75-250 nm is combined with a primer layer of 200 nanometer to 3 micrometer. Preferably, thinner layers of organic compound are combined with relatively thinner layers of primer, and thicker layers of organic compound with thicker layers of primer. For crystalline layer thicknesses between 100-200 nm preferably a primer layer of 0.3-0.6 gram per sqm is used.

In a further embodiment, in particular in applications which do not require barrier properties of the organic compound layer, the substrate comprises a metal layer, a crystalline organic compound layer, a printing pattern and a cover varnish layer substantially over the whole of the width of the film. The crystalline organic compound enhances the printability, and the quality of the print pattern. In this embodiment, preferably the crystalline organic compound layer has a thickness of about 80 nanometer or less. In this way, color interference of the crystalline organic compound layer and the metalized layer is prevented. Furthermore, preferably, the inks and the cover varnish layer have good moisture resistance.

The multilayer substrate, preferably with a primer over the whole of the film substrate can be used very well in laminates with a further plastic film.

In a further preferred embodiment of the present invention, the laminate comprises an adhesive layer between the crystalline triazine layer with the printing pattern and a further plastic film.

Laminates generally are made in a laminating station. The film on which the adhesive is applied generally is transported over a plurality of rolls to apply the adhesive, and thereafter, the film with the adhesive is pressed to the second film which is guided over a larger guiding roll.

In one preferred embodiment according the invention, the lamination process is performed such that the multilayer substrate is transported over the larger guiding roll, and that the further plastic film is provided with the adhesive. Here the glue, which can be either solventless or solvent based, is applied on the sealant film (e.g. PE or CPP) and laminated against organic compound coated film. This process is in particular preferred, in case the substrate with the crystalline organic compound layer does not comprise a printed pattern, because e.g. no printed pattern is required, or the printed pattern is "reverse printed" on the further plastic film. Reverse printing is possible, but generally less preferred, because the further film often is more flexible, causing difficulties in printing.

In one preferred embodiment the film coated with crystalline organic layer is laminated between two other substrates, so called triplex laminates. For example a melamine coated PET or OPA is laminated on one side against an OPP, which is optionally (reverse) printed, and on the other side to a sealant film (e.g. PE or CPP). It has been found that such laminate structures have excellent barrier properties especially at high humidity's.

As an adhesive, solvent based adhesives or solventless systems can be used. In a preferred embodiment of the invention, the adhesive has a good adhesion to the printed layers, and has a high strength. Suitably, the adhesive has a low expansion, high Tg, high crosslink density and a high intrinsic water barrier. Examples of adhesives include various type of UV- or thermal curable resins based on acrylates, epoxies, isocyanates (urethanes), and polyester. Particularly preferred are polyester based adhesives.

In a further embodiment, a film is directly extruded on the crystalline organic compound layer which optionally may have a printing pattern. In this case, reverse printing is not common, and a substrate with a crystalline organic compound layer and either a primer, or a varnish over the whole surface of the substrate is preferred. The direct extrusion lamination is preferably performed at a relatively low temperature. A low temperature saves energy and improves barrier characteristics. Generally, extrusion lamination is performed at about 400° C. to oxidise the extruded film in order to improve adhesion in other systems. It appeared that such high temperature is not necessary, so, preferably, the extrusion lamination is performed at a temperature of about 350° C. or lower, even more preferable about 3000° C. or lower, and most preferred about 200° C. or higher.

In a preferred embodiment of the invention, the laminate with barrier properties is sealable. This can be achieved by laminating the organic compound coated film against sealants based on polyethylene (PE) or cast polypropylene (CPP). It is also possible that a carrier substrate, on which crystalline organic compound is deposited, is sealable on one side, such as sealable BOPP. It is also possible that the carrier substrate with crystalline organic compound and optionally a print pattern is coated with a so-called hot seal coating. The later two examples are called monoweb applications.

Preferably the multilayer substrate, when laminated at the side of the crystalline organic compound layer with the primer and a print, with an adhesive and a plastic film is able to exhibit a lamination strength of about 2.5 N/inch or more, more preferably of about 3 N/inch or more, even more preferably of about 3.5 N/inch or more as measured with a tensile testing apparatus at 30 mm/min and at 90 degree. Generally, the upper limit of the lamination strength is not critical, but generally, this will be about 20 N/inch or less. The lamination of the composite layer for testing preferably is done with an appropriate urethane adhesive and laminated with a 30-100 μm thin polyethylene film or CPP films with similar thickness range. The precise thickness does not have substantial influence on the threshold value; as far as influence would be observed, the test should be done with a 50 pm polyethylene; and if CPP is defining the value, 50 μm CPP (cast polypropylene). Thereafter, the lamination strength of the two films can be measured, and the failure mode can be observed. An appropriate adhesive is an adhesive that has such adhesion strength that the failure mode is not observed on the adhesion layer. The adhesion may be so high that the plastic film breaks. The value of the force necessary to break a film can in that case be taken as value for adhesion.

The organic compound layer according to the invention may comprise in principle, any organic compound. A preferred organic compound is a crystalline triazine compound such as for example melamine, melam, melem and melon.

The organic compound preferably has a vapour pressure of about 1 Pa (0.01 mBar) or higher at 30° C. below its decomposition temperature. Preferably, the vapour pressure is about 10 Pa or higher. Generally, the vapour pressure will be about 1000 Pa (100 mBar) or lower.

For obtaining improved barrier properties, the compound should be crystalline, and have a Tm>50 ° C., preferably >100° C. For protecting the activity of alumina, it is preferred that the organic compound has a Tm (or Tg or rubbery-to-plastic phase-transition), of 70° C. or more, preferably 100° C. or more.

The Mw of the organic compound in general will be lower than 1000. Preferably, the organic compound is not polymerizing on the surface, as that causes substantial processing problems. Furthermore, the organic compound preferably is non-aliphatic (thus, it has ether, ester, amide, keton groups and the like) such that the compound is sufficient polar to adhere well to the substrate.

The saturation pressure preferably is more than 4 times the square root of the molar mass of the compound divided by the absolute temperature at which the compound is evaporated in the heater.

The specific heat of sublimation preferably is about 0.5 kJ/g or higher, preferably about 0.6 kJ/g or higher. Generally, the specific heat of sublimation preferably is about 2 kJ/g or lower, more preferably about 1.5 kJ/g or lower, and most preferable about 1.2 kJ/g or lower.

In a further preferred embodiment, the organic compound comprises one or more groups that have the ability to form hydrogen bonds, such as for example —NH2, —OH, —COOH, —NRH and the like.

In a further preferred embodiment, the organic compound comprises cyclic groups, such as one or more aromatic, cyclopentane, cyclopentene, cyclohexyl, admantane or cyclohexenyl groups; one or more aromatic groups are preferred.

In a further preferred embodiment, the cyclic ring comprises a heterogeneous atom like oxygen, sulphur and preferably nitrogen like pyrimidine.

In a further preferred embodiment, the organic compound comprises of two aromatic rings which are linked together by a flexible spacer unit. The flexible unit may contain —NH—, or —CH2— groups.

Examples of suitable non-triazine compounds include derivatives from pyrimidine trione, pyran-2,4,6-triol, bipyridine, naphthalenehexol, diamino-dihydro-oxo-pyrimodine, myo-inositol, diazozspiro-decane-trione, benzenetriol, cyclohexanetricarboxilic acid, hydroxybenzene-carboxilic acid, pyridinedicarboxilic acid esters, 9-methylanthracene, 9-methylcarbazole, dibenzothiophene, nonanedioic acid, 4,4'-azoxyanisole, 4-hydroxybenzaldehyde, triphenylamine, 4,4'-dichlorodiphenylsulphone, adipic acid, p-phenylphenol, p-aminophenol, aluminiumacetoacetonate, 3-hydroxy benzoic acid and terephthalic acid.

In one preferred embodiment of the invention, the crystalline organic compound is a triazine which may comprise in principle, any triazine compound, for example melamine, melam, melem, or melon. Preferably, the triazine compound is melamine.

The organic compound layer can protect the metal (in particular alumina) layer against de-activation. Unprotected alumina layers need corona treatment after some month of storage, in case a converter wants to make a laminate. It appears that the organic layer overcomes the necessity to perform a corona treatment, thereby saving money, and speeding-up the lamination process.

In a preferred embodiment, the organic compound layer also improves the barrier properties. The organic compound layer helps to protect the metal or metal-oxide layer against the impact of both soft roll and hard roll printing processes which are used to print films, which is further improved according to the present invention.

In a further preferred embodiment, the organic layer further improvers the printability, not only by protecting the metal or metaloxide layer, but also because it is a compound with better intrinsic printability characteristics.

The thickness of the crystalline organic compound layer as formed on the substrate in the vapour-depositing step depends on its intended purpose, and can thus vary within wide limits. Preferably, the thickness of the layer is about 400 nm or less, more preferably about 250 nm or less,. The minimum thickness is preferably about 2 nm or more, more preferably about 10 nm or more, and even more preferred about 75 nm or more as such thickness improves the protective properties. The thickness can be for example between about 105 and about 200 nm like for example, about 200 or about 150 nm.

For application involving printing on metalized films, the suitable ranges include between 5 and 80 nm, preferably between 10 and 70 nm, and even more preferable between 20 and 60 nm. In applications involving the use of only an organic compound as the coating giving barrier properties, the thickness is preferably as described above, about 75 to about 250 nm. For metal oxide coated films, such as aluminium oxide, silicon oxide or a combination thereof, the suitable ranges are between 20 and 300 nm and more preferably 60-200 nm.

The crystalline organic compound layer may be a single layer, it is however also possible that on the crystalline triazine layer further layers are present, for example further layer of organic compound, a further polymer layer and/or a cured resin layer. In one preferred embodiment, different organic compounds are deposited in one pumping and sequentially on top of each other. In one embodiment, in one pumping first melamine and subsequently melam is deposited on top of melamine.

In a further embodiment in one pumping first a crystalline organic compound, such as melamine or melam, is applied and subsequently a metal or metal oxide coated layer is deposited on top of the crystalline organic compound. The film on which the crystalline compound is deposited is preferably a PET film which may be optionally pre-coated with a layer of release coating. The final product may be used in processes such as transfer metalising used for example for label and lid applications onto paper.

The barrier properties and/or the adhesion of the organic compound layer can improve if the substrate (before applying the crystalline organic compound layer) is treated first with a primer layer. As the primer various types of compounds can be used. Examples include UV curable monomers such as acrylates and epoxies and various types of thermoset resins such as epoxies, isocyanates or polyester based adhesives. It is also possible to use chemical vapour deposition (CVD) methods to apply the primer such as parylene. The application of the primer can occur in-line (in the vacuum chamber) by first applying the primer, for example by vaporization, atomisation or CVD followed by deposition of the organic compound, or off-line, i.e applying the primer outside the vacuum chamber. The combination of in-line and off-line methods using different types of primers and adhesives is also possible. To achieve higher barrier properties, this process can be repeated many times to produce a composite structure consisting of the base substrate (for example PET), primer, triazine layer, primer, organic compound layer, primer and so on.

In case an organic compound layer is applied on a metal or metaloxide layer, it may be preferable to apply a plasma treatment as for example described in WO2009/121685, and/or an adhesion promoter as described in WO2009/12878.

A triazine comprising layer and a process for making such layer is described in WO2004/101662. In WO2004/101662 a process is described wherein in a vapor deposition step a triazine compound, preferably melamine, is deposited on a substrate, at reduced pressure, the temperature of the substrate being below the temperature of the vaporized triazine. Other references are WO2009/12878; WO2008/92553; WO2008/83934 and WO2010/03965

Preferably, the primer comprises a film forming binder and a solvent.

Preferably, the varnish comprises a film forming binder and a solvent.

The film forming binder preferably comprises a polymer, which may be cross-linkable or substantially non-reactive. For flexography printing, the polymer is preferably substantially non-reactive. For rotogravure printing, the polymer is preferably substantially reactive. The reactive mixture consists preferably of two component systems based on polyurethane and/or polyalcohols and isocyanate as the crosslinker.

In one embodiment of the invention, as solvent in the resin composition it is preferred to have a low amount of water. Preferably, the amount of water in the solvent is about 4 wt % or less, preferably about 1 wt % or less. It is furthermore preferred to have the amount of alcohol compound low as well. Preferably, the amount of alcohol compound is about 20 wt % or less, preferably, about 10 wt % or less. Preferably, the solvents comprise hydrocarbon based solvents. Suitable hydrocarbon based solvents include; xylene, ethylbenzene, naphta-cuts, toluene, n-hexane, octane and the like. Other suitable solvents include esters like ethyl-acetate, methoxy-propylacetate, diethyl-ester of butanedicarboxylic acid, ketones like ethyl-methylketone, acetone and the like. However, esters and ketones may be less preferred as they may adversely affect the triazine layer. The esters and ketones preferably are present in about 20% of the solvent or less, more preferably about 10 wt % of the solvent or less.

In another embodiment of the invention, the inks comprise a substantial amount of alcohol, like for example between 20 wt % and 60 wt %.

In one embodiment of the invention, the binder comprises a polymer, such as for example a polyester, polyether, acrylic polymer, polycarbonate, polyhydrocarbon or mixtures and/or copolymers of these. Suitable examples of such polymers include, but are not limited to, alkyd and modified alkyd resins; modified alkyd being acrylated or epoxydized alkyds, saturated polyester; acrylic modified polyester; polyamide; acrylic resin, polyethers (like polyethyleneoxide; polypropyleneoxide, polytetrahydrofuran, poly(methyl)tetrahydrofuran, ethyleneoxide-butyleneoxide copolymers, ethylene-oxide-propyleneoxide copolymers); polycarbonate; PC-PPO copolymers; TMP-tri/hexa-caprolacton; alkoxylated pentaerytritol, ethoxylated BPA, acrylamide resin; OH-functional acrylic resins; epoxy-esters; epoxy functional phenolic resin or polyester-phenolic resin; hydroxylated polybutylene, hydroxylated C9 resins, hydroxylated C5-resins, and maleic acid anhydride grafted hydrocarbon resins. Further, polymers based on natural materials like cellulose oligomers can be used.

Preferably, the number average molecular weight of the further polymer is about 50000 or lower, preferably about 20000 or lower, and about 500 or higher, preferably about 1000 or higher.

Suitable examples of non-crosslinkable resins are for example acrylic resins, methyl-cellulose, hydrocarbon resins (tackifyers), and the like.

As additives, the print-primer composition may comprise stabilizers, flow-agents, wetting agents, shielding agents, coloring agents, anti-blocking agents, adhesion promoters, anti-static agents, anti-fouling agents like fluorinated materials, silicon fluids, acrylic polymers, tackiness agents to make film sealable and the like. These additives generally will constitute about 0.1 wt % or more of the resin composition, often about 1 wt % or more. Generally, the amount will be about 20 wt % or less, preferably about 10 wt % or less.

In case of a crosslinkable resin, the print-primer composition can contain a catalyst to increase the cure speed and/or to lower the curing temperature.

Generally, the viscosity of the print-primer composition at 23° C. will be dependent on the type of printing method (e.g. flexography versus rotogravure) and can be about 0.001 Pa.s or higher, preferably about 0.01 Pa.s or higher. Generally, the viscosity will be about 1 Pa.s or lower, preferably about 0.1 Pa.s or lower as measured on a viscosimeter.

The print-primer composition can be applied with a gravure coater or by other known means. Preferably, the print-primer composition is applied at a thickness of about 100 nm or more, preferably about 1 µm or more. Generally, the thickness will be about 100 µm or less, preferably about 10 pm or less. Suitable thickness (as dry primer) can be for example about 0.4, 0.7, 1.0, 1.5, 2, 3 or 4 µm.

Drying can be achieved by heating the substrate with the resin composition in an oven, or by infra-red irradiation, or by blowing off organic solvent.

As explained, the substrate with the crystalline melamine layer can be printed with methods known in the art such as for example flexography, gravure (or letterpress) printing. According this invention, the crystalline triazine layer is preferably first provided with a primer-print layer substantially over the whole area of the film, directly before applying the figurative print. Following types of inks can be used: UV inks; EB (electron beam) inks; PVB (Poly Vinyl Butyral) inks; PVC (Poly Vinyl Chloride) inks; NC inks and Polyamide inks UV inks are more preferred for Flexo than for Gravure, because of the viscosity. The ink may have too high viscosity for gravure and therefore the ink would not be able to reach all the holes in the gravure plate.

UV Curable screen printing ink is a 100% solid system: that is, it essentially does not contain solvent that must evaporate during the curing phase. The cure takes place through the interaction of the ink ingredients and a strong UV (ultra violet) light source in a dryer. Solvent inks may have better coverage, and they are relatively inexpensive, while having good durability. UV curable inks have the advantage of lack of VOC's, rapid curing and excellent color value. Some disadvantages can be: The ink is not applicable on all substrates, it cannot be printed on dark substrates; the outdoor durability may be limited, they may be less suitable for high levels of abrasion; they tend to be less flexible, and they are more sensitive to proper cure procedures.

EB inks are suitable as well. Both UV and EB systems typically use acrylate materials (although other special chemistries are available) that cure by free radical polymerization. In the case of UV curing, the UV light is absorbed by chemicals called photoinitiators. These materials convert the UV light into free radicals. The free radicals cause the acrylate materials to chemically react and form acrylic polymers. In EB curing, a photoinitiator is not needed. The energy of the electrons is enough to directly cause the acrylate materials to polymerize by opening the acrylate bonds to form free radicals. These radicals then attack the remaining acrylate bonds until the reaction reaches completion. UV curing and EB curing inks, coatings and adhesives, when properly formulated, applied and cured, can satisfy the needs of many applications. EB chemistry more easily meets the needs of low odor, low off-taste applications. For thick films, opaque colors and through-film curing, EB is more appropriate. UV/EB inks are quite common in food packaging. UV inks are mostly used for label applications. The potential for migration of hazardous photoinitiators in to the package limits the use of such types of inks.

PVB inks can be well used both in Flexo and in Gravure, as they are well soluble in alcohols, and partly soluble in esters. Polyvinylbutyral (PVB): Inks based on PVB resins are widely used for retort printing because of their effective adhesion and heat stability: The resins melt at about 110° C. (230° F.) but the molecules are stable up to about 250° C./482° F. PVB inks have some disadvantages: the most important is the incompatibility between the adhesion promoters used in PVB inks and nitrocellulose (NC). Printers using both NC and PVB inks must thoroughly clean presses and auxiliary equipment (hoses, ink pumps, ink containers, cylinders, etc) between runs to avoid poor print quality.

PVC inks are less suitable in Flexo, and more suitable in Gravure. PVC copolymers have long been used in inks for retort applications in Europe. These inks do not require adhesion promoters and they perform on plain and coated films, give excellent print results and can be laminated with most adhesives. There are, however, two disadvantages: PVC inks are only soluble in esters and ketones, making them unsuitable for flexo printing. The chlorine content also makes PVC inks difficult and expensive to dispose of - high temperature incineration is typically required.

Nitrocellulose inks (NC inks) are well suited for Flexo and for Gravure. Nitrocellulose -based inks are the modern global standard for most flexo and gravure printing; However, they are not suitable for retort applications because NC degrades at high temperatures. These inks also typically require PU and PA co-binders.

PA binders are used in both Flexo and Gravure. Polyamides (PA) are standard ink resins in North America, typically used with cellulose acetate butyrate (CAB) and PVB co-resins. PA inks provide good bond strength on many substrates and excellent printability; they are suitable for both flexo and gravure printing. They share the limitations of the PVB resins as they also require adhesion promoters, which make PA inks incompatible with NC.

Polyurethanes (PU) binders can be used both for Flexo and for Gravure. The PU resins in use today are employed mostly as co-binders in NC, PVB and PVC systems.

Binders for the inks may be the same as the binders for the primer as described above.

The colour of an ink system is created by using pigments or dyes. Typically, pigments are insoluble, whereas dyes are soluble, though sometimes these terms are used interchangeably in commercial literature. Ink pigments are both inorganic and organic. Most white inks contain titanium dioxide as the pigment; black color is created with carbon black. Metallic pigments like aluminium powder (aluminium bronze) and copper-zinc alloy powder (gold bronze) are used in novel silver and gold inks. Miscellaneous inorganic pigments provide luminescent and pearlescent effects.

Suitable pigments or dyes for printing inks are for example .Diarylide Yellow, Benzimidazolone (yellow or red), Disazopyrazolone (orange), Naphthol (red), Triarylcarbonium (red or bleu), Cu Phthalocyanine (bleu or green), The substrate comprises a material that serves as carrier, and this generally will be a plastic or paper in the form of a film or web.

In flexible packaging for food generally two types of polymers film structure are used; mono-web and multi-layer. In the mono-web applications, the triazine compound is coated on a sealable film. The sealability function on the film is either induced by co-extrusion process during film production or by applying coatings such as acrylics. For pressure sensitive label applications, the film may be coated with pressure sensitive glues. On the triazine coated side, various types of inks can be applied. Preferably the triazine coated side is over lacquered by a varnish. In the multi-layer applications, the triazine coated film is laminated against one or more films which can be optionally reverse printed. Alternatively the print layer is applied directly on the triazine coated film. The lamination can be carried out by extrusion lamination/coating, solventless, or solvent based.

The substrate film may consist of a homogeneous material, or it may itself be non-homogeneous or a composite material. The substrate film may comprise various layers. Preferably, the film comprises a polymeric material. Examples of polymeric compounds are thermoplastic compounds and thermosetting compounds. Suitable examples of thermoplastic compounds include polyolefins, polyolefin-copolymers, polyvinylalcohol, polystyrenes, polyesters and polyamides. Suitable examples of such polymers include HD or LD polyethylene (PE), LLD polyethylene, ethylene-propylene copolymers, ethylene-vinylacetate copolymer, polylactic acid, polypropylene (PP) and polyethylene terephtalate (PET). These thermoplastic compounds are often used in the form of a film, either as such or oriented; such orientation may be biaxial, such as for example biaxially oriented polypropylene film (BOPP), biaxially oriented polyamide (BOPA) and biaxially oriented polyethylene terephthalate (BOPET). The film may also comprise a layer of paper.

Flexible packaging materials generally are based on film or sheet like materials, hereinafter named film.

The multilayer structure according the invention, in particular the ones with a film as substrate may be used as such, but can also be applied on plastic, paper, cardboard, and the like.

The multilayer structure, optionally further processed by for example laminating, can be applied as or to all kind of packing materials, for example paper, sheet and films. The packing material protects very well its content from for example oxygen, in this way increasing shelf life of for example food products or personal care products, pharmaceutical products or protecting electronic components from oxygen attack.

In one embodiment of the invention, the multilayer structure is part of a packing for food and beverage products. Suitable food and beverage products include, but are not limited to coffee beans or milled coffee beans, beer, fruit juice, tomato ketchup, milk, cheese, prepared food and the like.

In a further embodiment, the packaging comprises a PET substrate, crystalline triazine layer, poly-olefin layer, paper or cardboard layer and a further polyolefin layer.

In a further embodiment, the packaging comprises a PET, BOPP, OPA or PLA substrate, an aluminium oxide layer, a melamine layer, optionally a printing pattern on the melamine layer, an adhesive layer, a sealant layer such as PE, CPP or OPA/CPP.

In another embodiment of the invention, the multilayer structure or laminate is used in or on displays or other electronic products, preferably flexible electronics products. One example of an electronic flexible product is a flexible display.

The composite layer according the invention has favorable barrier properties, for example a low oxygen transmission rate (OTR) and a low water vapor transmission rate (WVTR), and is sufficient wear resistant.

The OTR is generally measured in an atmosphere of 20-30° C. and between 0% and 85% RH. The preferred values generally depend on the substrate. In case the substrate is biaxially oriented polypropylene (BOPP), the OTR generally will be about 400 cc/m2·24 h or less, preferably about 300 cc/m2·24 h or less and even more preferred about 200 cc/m2·24 h or less. Generally, in case of BOPP, the OTR will be about 20 cc/m2·24 h or higher, and for example may be about 50 cc/m2·24 h or higher. The OTR can be measured with suitable apparatus, such as for example with an OXT-RAN 2/20 manufactured by Modern Control Co. In case the substrate is a PET film, the OTR generally will be about 50 cc/m2·24 h or less, preferably about 30 cc/m2·24 h or less and even more preferred about 10 cc/m2·24 h or less. Generally, in case of PET, the OTR will be about 0.3 cc/m2·24 h or higher, and for example may be about 0.5 or 1 cc/m2·24 h or higher.

Water vapor permeability (WVTR) can measured with a PERMATRAN 3/31 manufactured by Modern Control Co, in an atmosphere of 25-40° C. and between 50 and 90% RH. The preferred values will depend on the substrate. For example for BOPP the WVTR is generally about 3 g/m2.24 h or less, preferably about 2 g/m2·24 h or less, and more preferably about 1 g/m2·24 h or less. Generally, the vapor permeability will be about 0.1 g/m2·24 h or more, for example about 0.2 g/m2·24 h or more. For example for PET, the WVTR is generally about 8 g/m2·24 h or less, preferably about 7 g/m2·24 h or less, and more preferably about 4 g/m2·24 h or less. Generally, the vapor permeability will be about 0.5 g/m2·24 h or more, for example about 2 g/m2·24 h or more.

Preferably, the laminate has an OTR and WVTR also for other substrates, which is conform the values given in the former two paragraphs.

In one embodiment, the laminate comprises a PET or BOPP film as substrate, a crystalline triazine layer as barrier layer, optionally a metal oxide layer such as aluminum oxide, the laminate further comprising on the crystalline triazine layer a print primer covering substantially the whole area of the triazine coated film, and a pattern or figure and an adhesive and thereon a further film, which may be a polyolefin film, such as preferably a PE film. In another preferred embodiment, the polyolefin film has reverse printing instead of direct printing on the triazine layer.

The crystalline organic layer may be deposited by thermal deposition, infrared heating, microwave heating. The metal or metal oxide layers may be deposited by thermal evaporations (both electron beam or both type), sputtering, plasma induced chemical vapor deposition (PECVD) or plasma assisted evaporation. For deposition of aluminum oxide, preferably the plasma assisted evaporation is used.

In case an organic compound layer is applied on a metal or metaloxide layer, it may be preferable to apply a sputtering treatment as for example described in WO2009/121685, a plasma treatment with conditions as descried in WO2009/121685 (but without the sputtering), and/or an adhesion promoter as described in WO2009/12878.

Aluminum oxide coated layers are in general brittle and not printable. We have found that application of a layer of crystalline organic compound, preferably a traizine compound, and more preferable melamine or melam, provides enhanced oxygen and water barrier and induces printability. The most preferred thickness of a crystalline melamine layer as coating on AlOx layer is between 60-80 nm.

The invention will be further elucidated by the following non-limiting examples.

EXAMPLES 1-3 AND COMPARATIVE EXPERIMENTS A-B

A biaxially oriented polypropylene film (BOPP) of 37 pm was plasma treated and coated with melamine at a vacuum of 50 μPa. The film speed was 5 m/sec.

The films were thereafter treated as described in Table 1; and as far as applicable, printed in a printing machine with 6 rolls; the first was used to apply an ethylacetate/ethanol 50/50 wt% based primer having a polyurethane based binder. In Example 1, this primer was printed over the whole area of the film.

Films were further printed with letters (black ink), and a color photo (three colors); the 6th roll was idle.

The films were laminated with a further plastic film (BOPP) while using a urethane adhesive, solvent based with ethyl-acetate as solvent.

The Oxygen transmission rate (OTR) was measured with OXTRAN 2/20 manufactured by Modern Control Cop. In an atmosphere of 23 ° C. and 0 and 85% RH. Results are given in Table 1.

TABLE 1

| Example | 1 | 2 | A | B | 3 |
|---|---|---|---|---|---|
| Sample | Primed and Printed | Not primed, but printed | No melamine | No print | Primed on the surface of the actual print area only, and printed |
| Oxygen transmission 0% RH in (cc/mm)/ (m² *day | 10.3 | 17.6 | 30.7 | 9.2 | 17.1 |

From these experiments it is clear that printing with only a primer under the printed area, or without primer does decrease the barrier properties of the melamine barrier layer, but that the decrease can be largely prevented by first applying a primer over the whole area of the film.

EXAMPLES 4-5 AND COMPARATIVE EXPERIMENTS C-E

A PET (12 pm) or BOPP (17 pm) film was coated with aluminum oxide, and further coated with melamine. As sealant film a CPP film was laminated with NeoRez P900 adhesive. The bond strength was measured. It appeared that with this glue, the bond strength was high with melamine layers of around 10-20 nm. At higher thicknesses, the bond strength was low. With other adhesives, it was also possible to get sufficient bond strength at high melamine layer thicknesses, but such processes were more critical.

| Experiment | Substrate | Sealant | Glue | Bondstrength (N/25 mm) D180 |
|---|---|---|---|---|
| Example 4 | PET-AlOx-20 nm | CPP (70 μm) | SB P900 NeoRez | 13 |
| Comparative experiment C | PET-AlOx-60 nm | CPP (70 μm) | SB P900 NeoRez | 0.5 |
| Comparative experiment D | PET-AlOx-80 nm | CPP (70 μm) | SB P900 NeoRez | 0.2 |
| Example 5 | OPP-AlOx-10 nm | CPP (70 μm) | SB P900 NeoRez | 4.2 |
| Comparative experiment E | OPP-AlOx-40 nm | CPP (70 μm) | SB P900 NeoRez | 0.5 |

EXAMPLES 6-11

A number of films (of PET 12 μm, or BOPA 15 μm) were coated with melamine via vapor deposition (single coat, no metal or metaloxide coating). The OTR before printing, and optional lamination, was about 2. Films were printed with inks having a polyester binder, and nitrocellulose co-binder. The solvent was a 75/25 vol % mixtrure of ethylacetate and alcohol. Four printed films were also laminated (with a PE sealant film). The OTR after printing and optional laminating is given in the following table. Although coating thicknesses below 60 nm still gave an improvement of OTR, the OTR was substantially more improved with higher thicknesses, like between 60-200 nm or 100-200 nm.

| Examples | Substrate | Mx thickness (nm) | Ink | Laminate | OTR after printing (cc/m2/day)* |
|---|---|---|---|---|---|
| 6 | PET | 47 | Gravure | No | 18.59 (1.9) |
| 7 | PET | 197 | Gravure | No | 67.56 (2.0) |
| 8 | BOPA | 50 | Flexo | yes, PE | 64.2 (2.0) |
| 9 | BOPA | 155 | Flexo | yes, PE | 17.85 (1.8) |
| 10 | PET | 41 | Gravure | yes, PE | 72.8 (5.0) |
| 11 | PET | 212 | Gravure | yes, PE | 17.4 (2.2) |

*Numbers in brackets are from reference film, coated with melamine, before printing and laminating

What is claimed is:

1. A process for making a multilayer structure with a printed pattern by
   a) providing a film substrate having a crystalline organic compound layer, wherein the substrate optionally has a metal or metaloxide layer between the film substrate and the organic compound layer;
   b) applying a printed pattern via a plurality of printing rolls wherein the following steps are performed:
   b1) applying one or more ink layers directly on the film to obtain a printed pattern, and
   b2) optionally, applying a cover varnish layer;
   to obtain a film substrate with a crystalline organic layer and a printed pattern, wherein the ink comprises a pigment, a binder and a solvent, wherein the binder comprises a polyurethane, polyamide, or polyvinylbutyrate, or wherein the ink is a UV, or EB curable ink.

2. The process for making a multilayer structure with a printed pattern according to claim 1, further comprising applying a further film.

3. The process according to claim 2, wherein the lamination process is performed such that the multilayer substrate is transported over a first guiding roll, and that the further plastic film is provided with the adhesive over a number of guiding rolls, wherein the adhesive is applied on the further plastic film and laminated against organic compound coated film.

4. The process according to claim 2, wherein the lamination process is performed such that a film is directly extruded on the substrate film having the crystalline organic compound layer optionally having the printing pattern, wherein the substrate with a crystalline organic compound layer has been provided with a primer, or a varnish over the whole surface of the substrate before extrusion lamination.

5. The process according to claim 1, wherein the printing is performed by rotogravure or flexoprinting.

6. The process according to claim 5, wherein the printing is performed using flexo printing technique with an ink containing thylacetate or a mixture of ethylacetate and an alcohol.

7. The process according to claim 1 wherein the crystalline organic compound is provided in a layer of a thickness of between 75-250 nm.

8. The process according to claim 1, wherein a primer is applied or present over substantially the whole surface of the crystalline organic compound.

9. The process according to claim 1, wherein the crystalline organic compound is applied or present on the substrate of a thickness of 10-300 nm.

10. The process according to claim 1, wherein the crystalline organic compound is a triazine.

11. The process according to claim 1, wherein the substrate layer is BOPP or PET or polyamide.

12. The process according to claim 1, wherein the adhesion of the laminate is at least 2.5 N/inch.

13. The process according to claim 1, wherein the substrate is provided with a metal or metal oxide layer between the film substrate and the organic compound layer.

14. The process according to claim 1, wherein the ink is a UV, or EB curable ink comprising a pigment and acrylates.

* * * * *